US012080998B2

(12) United States Patent
Sim et al.

(10) Patent No.: US 12,080,998 B2
(45) Date of Patent: Sep. 3, 2024

(54) IGNITION COIL CONTROL SYSTEM

(71) Applicants: HYUNDAI MOTOR COMPANY, Seoul (KR); KIA CORPORATION, Seoul (KR)

(72) Inventors: Kiseon Sim, Suwon-si (KR); Soo Hyung Woo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 176 days.

(21) Appl. No.: 17/952,862

(22) Filed: Sep. 26, 2022

(65) Prior Publication Data

US 2023/0109264 A1 Apr. 6, 2023

(30) Foreign Application Priority Data

Oct. 6, 2021 (KR) ........................ 10-2021-0132062
Jul. 25, 2022 (KR) ........................ 10-2022-0091866

(51) Int. Cl.
*H01T 15/00* (2006.01)

(52) U.S. Cl.
CPC .................................... *H01T 15/00* (2013.01)

(58) Field of Classification Search
CPC ................................ H01T 15/00; F02P 15/08
See application file for complete search history.

(56) References Cited

U.S. PATENT DOCUMENTS

| | | | | |
|---|---|---|---|---|
| 8,078,384 | B2 * | 12/2011 | Glugla | F02P 15/08 701/110 |
| 9,429,134 | B2 * | 8/2016 | Desai | F02P 9/007 |
| 10,006,432 | B2 | 6/2018 | Desai et al. | |
| 2013/0241429 | A1 * | 9/2013 | Ruan | F02P 3/0456 315/213 |
| 2014/0102412 | A1 * | 4/2014 | Czekala | F02P 3/045 123/406.12 |
| 2018/0258901 | A1 * | 9/2018 | Terada | F02P 3/04 |
| 2020/0200139 | A1 * | 6/2020 | Ohno | F02P 15/10 |

* cited by examiner

*Primary Examiner* — Phutthiwat Wongwian
*Assistant Examiner* — Arnold Castro
(74) *Attorney, Agent, or Firm* — Lempia Summerfield Katz LLC

(57) ABSTRACT

An ignition coil control system includes a spark plug that generates a spark discharge between a center electrode and a ground electrode and two ignition coils that respectively apply a current to the spark plug. The two ignition coils respectively include a primary coil, a secondary coil, and a main switch that selectively connects the primary coil. An auxiliary switch may be connected in parallel to each of the primary coils.

8 Claims, 8 Drawing Sheets

IGNITION COIL CONTROL SYSTEM

CROSS-REFERENCE TO RELATED APPLICATIONS

This application claims priority to and the benefit of Korean Patent Application No. 10-2021-0132062 filed in the Korean Intellectual Property Office on Oct. 6, 2021, and Korean Patent Application No. 10-2022-0091866 filed in the Korean Intellectual Property Office on Jul. 25, 2022, the entire contents of which are incorporated herein by reference.

BACKGROUND

(a) Field of the Disclosure

The present disclosure relates to an ignition coil control system, and more particularly, to an ignition coil control system that may perform multi-stage ignition.

(b) Description of the Related Art

In gasoline vehicles, a mixture of air and fuel is ignited by a spark generated by a spark plug to be combusted. In other words, the air-fuel mixture injected into a combustion chamber during a compression stroke is ignited by a discharge phenomenon of the spark plug. Thus, energy required for driving a vehicle is generated while the air-fuel mixture is undergoing a high temperature and high pressure expansion process.

The spark plug provided in the gasoline vehicle serves to ignite a compressed air-fuel mixture by spark discharge caused by a high voltage current generated by an ignition coil.

In a conventional spark plug, spark discharge is generated between a pair of electrodes (a center electrode and a ground electrode) by a high voltage current induced from an ignition coil, and an air-fuel mixture introduced into a combustion chamber is ignited.

In a case where lean-burn combustion or recirculated exhaust gas is introduced into an engine, since the ignition energy supplied into the combustion chamber should be increased, multi-stage ignition is used in which the spark plug is ignited multiple times during the explosion stroke.

However, when the ignition energy supplied into the combustion chamber is increased through the multi-stage ignition, severe or excessive heat generation may occur in the ignition coil.

The above information disclosed in this Background section is only to enhance understanding of the background of the disclosure. Therefore, the Background section may contain information that does not form the prior art that is already known in this country to a person of ordinary skill in the art.

SUMMARY

The present disclosure has been made in an effort to provide an ignition coil control system that may control a heating phenomenon or condition occurring in an ignition coil when performing multi-stage ignition.

An embodiment of the present disclosure provides an ignition coil control system including: a spark plug that generates a spark discharge between a center electrode and a ground electrode; and two ignition coils that respectively apply a current to the spark plug and respectively include a primary coil, a secondary coil, and a main switch that selectively connects the primary coil. An auxiliary switch may be connected in parallel to each of the primary coils.

The ignition coil control system may form a first circuit in which a battery, the primary coil, and the main switch selectively form a closed circuit, a second circuit in which the secondary coil, the center electrode, and the ground electrode selectively form a closed circuit, and a third circuit in which the primary coil and the auxiliary switch selectively form a closed circuit.

A first mode in which the first circuit forms a closed circuit to charge the primary coil, a second mode in which the first circuit and the second circuit form a closed circuit to charge the primary coil, a third mode in which the third circuit forms an open circuit to discharge the secondary coil, and a fourth mode that temporarily stops discharge of the secondary coil while discharging the secondary coil may be selectively performed.

In the first mode, the main switch may be turned on while the auxiliary switch may be turned off.

In the second mode, the main switch may be turned on and the auxiliary switch may be turned on.

In the third mode, the main switch may be turned off and the auxiliary switch may be turned off.

In the fourth mode, the main switch may be turned off while the auxiliary switch may be turned on.

Another embodiment of the present disclosure provides a control method of an ignition coil control system. The control system including: a spark plug that generates a spark discharge between a center electrode and a ground electrode; and two ignition coils that respectively apply a current to the spark plug and respectively include a primary coil, a secondary coil, a main switch that selectively connects the primary coil, and an auxiliary switch that is connected in parallel to the primary coils. The method includes charging the primary coil by controlling the main switch and controlling the auxiliary switch to temporarily stop discharge of the primary coil while the primary coil is being discharged.

According to the ignition coil control system of the embodiments of the present disclosure as described above, it is possible to prevent an ignition coil from being overcharged by controlling an auxiliary switch connected in parallel to a primary coil of the ignition coil.

BRIEF DESCRIPTION OF THE DRAWINGS

These drawings are for reference only in describing embodiments of the present disclosure, and therefore the technical idea of the present disclosure should not be limited to the accompanying drawings.

DETAILED DESCRIPTION OF THE EMBODIMENTS

Figure 1:
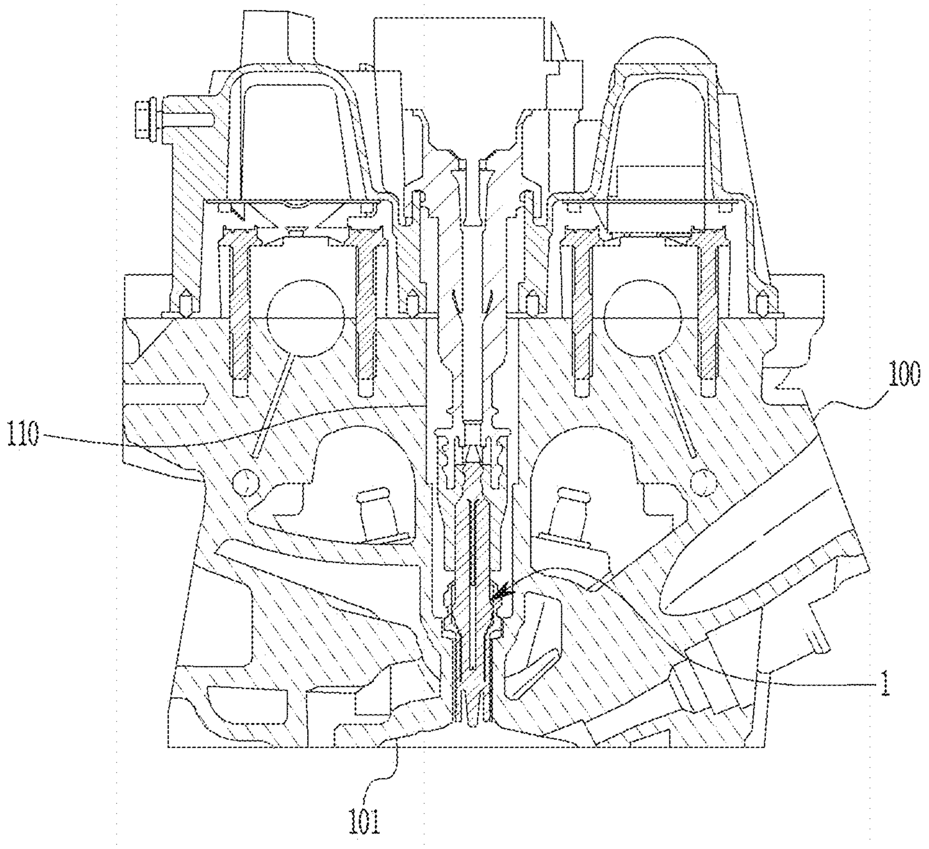
FIG. 1 illustrates a cross-sectional view of an engine in which a spark plug is installed according to an embodiment of the present disclosure.

The present disclosure is described more fully hereinafter with reference to the accompanying drawings, in which embodiments of the disclosure are shown. As those of ordinary skill in the art should realize, the described embodiments may be modified in various different ways, all without departing from the spirit or scope of the present inventive concept.

In order to clearly describe the present disclosure, parts that are irrelevant to the description have been omitted. Also, identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings. In order to clearly illustrate several parts and areas, enlarged thicknesses are shown.

Hereinafter, a spark plug according to an embodiment of the present disclosure is described in detail with reference to the accompanying drawings.

FIG. 1 illustrates a cross-sectional view of an engine in which a spark plug is installed according to an embodiment of the present disclosure.

As shown in FIG. 1, a spark plug 1 according to an embodiment of the present disclosure is installed on a cylinder of an engine and generates spark discharge.

The engine to which the spark plug 1 is applied includes a cylinder block and a cylinder head 100. The cylinder block and the cylinder head 100 are combined to form a combustion chamber 101 therein. An air-fuel mixture inflowing into the combustion chamber 101 is ignited by spark discharge generated by the spark plug 1.

In the cylinder head 100, a mount hole 110 in which the spark plug 1 is installed is formed in a vertical direction. A lower portion of the spark plug 1 that is installed in the mount hole 110 protrudes into the combustion chamber 101. A center electrode 2 and a ground electrode 3 that are electically connected to an ignition coil are formed at the lower portion of the spark plug 1. The spark discharge is generated between the center electrode 2 and the ground electrode 3.

Figure 2:
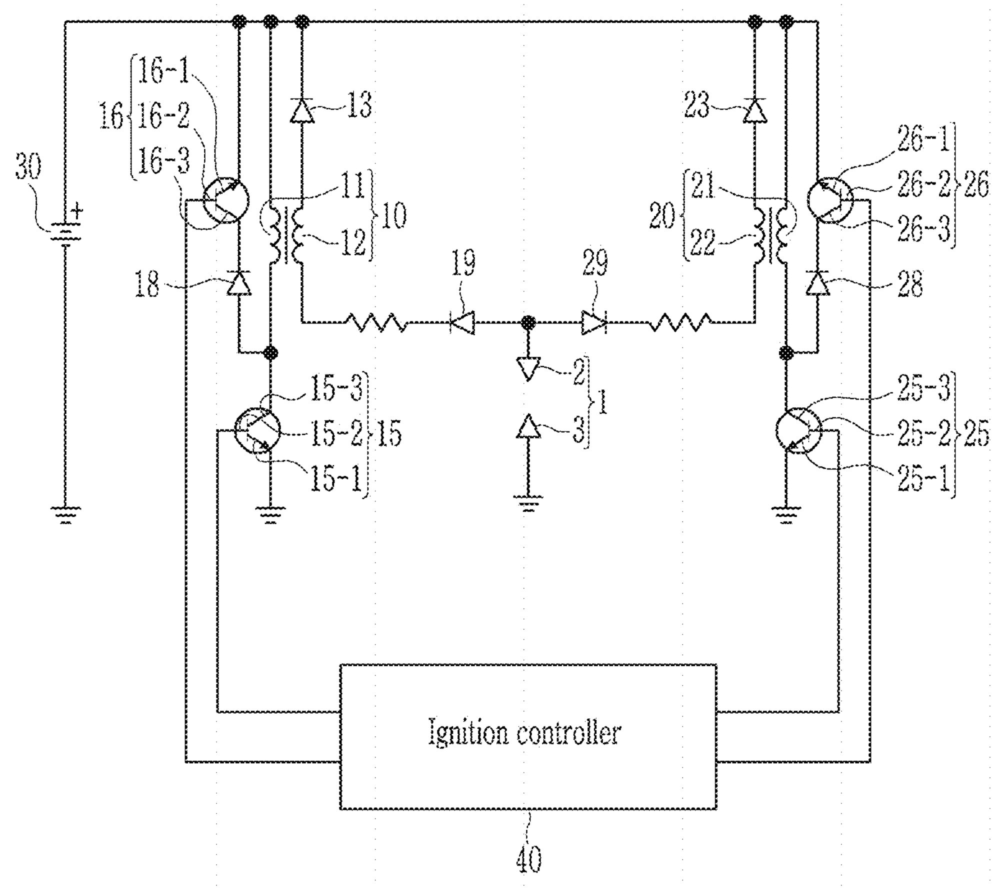
FIG. 2 illustrates a schematic view of an ignition coil control system according to an embodiment of the present disclosure.

FIG. 2 illustrates a schematic view of an ignition coil control system according to an embodiment of the present disclosure.

As shown in FIG. 2, an ignition coil control system according to an embodiment of the present disclosure may include at least one ignition coil and a controller for controlling an operation of the ignition coil.

According to an embodiment of the present disclosure, an ignition coil control system includes two ignition coils (a first ignition coil 10 and a second ignition coil 20) and is described herein, but the scope of the present disclosure is not limited thereto. An appropriate number of ignition coils may be provided according to the needs of the designer.

The first ignition coil 10 includes a primary coil 11 and a secondary coil 12. One end (e.g., a first end) of the primary coil 11 is electrically connected to a battery 30 of a vehicle and the other end (e.g., a second end) of the primary coil 11 is grounded through a first main switch 15. According to an on/off operation of the first main switch 15, the primary coil 11 of the first ignition coil 10 may be selectively electrically connected.

The first main switch 15 may be realized with a transistor switch (for example, an insulated gate bipolar transistor (IGBT)) including an emitter terminal 15-1, a collector terminal 15-3, and a base terminal 15-2. In other words, the other end of the primary coil 11 may be electrically connected to the collector terminal 15-3 of the first main switch 15, the emitter terminal 15-1 thereof may be grounded, and the base terminal 15-2 thereof may be electrically connected to an ignition controller 40.

The battery 30, the primary coil 11, and the first main switch 15 are connected in series and selectively form a closed circuit according to an operation of the first main switch 15. In the specification of the present disclosure, an electric circuit formed by the series-connected battery, primary coil 11, and first main switch 15 is referred to as a first circuit.

When the first circuit forms a closed circuit, a current is supplied from the battery 30 to the primary coil 11 and electrical energy is charged in the primary coil 11.

One end (e.g., a first end) of the secondary coil 12 is electrically connected to a center electrode 2 and the other end (e.g., a second end) thereof is electrically connected to the battery 30. A diode 13 is installed between the secondary coil 12 and the battery 30 to block a current from flowing from the secondary coil 12 to the battery 30. In addition, a diode 19 is installed between the secondary coil 12 and the center electrode 2 so that a current flows only from the secondary coil 12 to the center electrode 2.

The battery 30, the secondary coil 12, the center electrode 2, and a ground electrode 3 are connected in series, and a high voltage current (or induced electromotive force) is selectively generated in the secondary coil 12 according to the operation of the primary coil 11. In the specification of the present disclosure, an electric circuit formed by the series-connected battery 30, secondary coil 12, center electrode 2, and ground electrode 3 is referred to as a second circuit.

When the first circuit forms an open circuit by the first main switch 15, the primary coil 11 is discharged and a high voltage current is generated in the secondary coil 12 by electromagnetic induction. Accordingly, a current flows in the second circuit and a high voltage current is supplied between the center electrode 2 and the ground electrode 3 to generate a spark discharge. In other words, a current selectively flows in the second circuit by the operation of the first main switch 15.

Meanwhile, a first auxiliary switch 16 is connected in parallel to both ends of the primary coil 11 of the first ignition coil 10. The primary coil 11 and the first auxiliary switch 16 selectively form a closed circuit. In the specification of the present disclosure, an electric circuit formed by the primary coil 11 and the first auxiliary switch 16 is referred to as a third circuit.

The first auxiliary switch 16 may be realized with a transistor switch (for example, an insulated gate bipolar transistor (IGBT)) including an emitter terminal 16-1, a collector terminal 16-3, and a base terminal 16-2. In this case, the emitter terminal 16-1 of the first auxiliary switch 16 is electrically connected between the primary coil 11 and the first main switch 15, the base terminal 16-2 thereof is electrically connected to the ignition controller 40, and the collector terminal 16-3 thereof is electrically connected to the battery 30.

When the ignition controller 40 applies a control signal to the base terminal 15-2 of the first main switch 15, the primary coil 11 of the first ignition coil is electrically connected (the first circuit forms a closed circuit) and the primary coil 11 is charged with electrical energy.

When the ignition controller 40 does not apply a control signal to the base terminal 15-2 of the first main switch 15, a high voltage current (or discharge current) is generated in the secondary coil 12 due to electromagnetic induction of the primary coil 11 and the secondary coil 12. The discharge current generated in the secondary coil 12 flows to the center electrode 2. While spark discharge is generated between the center electrode 2 and the ground electrode 3 by the discharge current generated in the secondary coil 12, an air-fuel mixture inside the combustion chamber 101 is ignited.

In other words, when a control signal is applied to the first main switch 15, the first circuit forms a closed circuit and the primary coil 11 is charged by a current outputted from the battery. In addition, when no control signal is applied to the first main switch 15, the first circuit forms an open circuit. While a high voltage current induced in the secondary coil 12 is applied to the center electrode 2 along the second circuit, a spark discharge is generated between the center electrode 2 and the ground electrode 3.

When a control signal is applied to the base terminal of the auxiliary switch while the first circuit forms a closed circuit, the third circuit forms a closed circuit. In this case, when the third circuit forms the closed circuit, the primary coil 11 electrically connected to the battery 30 is no longer charged, and the electrical energy already charged in the primary coil 11 while flowing along the third circuit remains stored.

While the first circuit forms an open circuit (in other words, while the secondary coil is discharged), when a control signal is applied to the base terminal of the auxiliary switch, the third circuit forms a closed circuit. In this case, when the third circuit forms a closed circuit, the electrical energy charged in the primary coil 11 flows along the third circuit, and the voltage applied to the secondary coil 12 is considerably reduced. Accordingly, the discharge in the secondary coil 12 is temporarily stopped.

Like the first ignition coil 10, the second ignition coil 20 includes a primary coil 21 and a secondary coil 22. One end (e.g., a first end) of the primary coil 21 is electrically connected to the battery 30 of the vehicle and the other end (e.g., a second end) of the primary coil 21 is grounded through a second main switch 25. According to an on/off operation of the second main switch 25, the primary coil 21 of the second ignition coil 20 may be selectively electrically connected.

The second main switch 25 may be realized with a transistor switch (for example, an insulated gate bipolar transistor (IGBT)) including an emitter terminal 25-1, a collector terminal 25-3, and a base terminal 25-2. In other words, the other end of the primary coil 21 may be electrically connected to the collector terminal 25-3 of the second main switch 25, the emitter terminal 25-1 thereof may be grounded, and the base terminal 25-2 thereof may be electrically connected to the ignition controller 40.

The battery 30, the primary coil 21, and the second main switch 25 are connected in series and selectively form a closed circuit according to an operation of the second main switch 25. In the specification of the present disclosure, an electric circuit formed by the series-connected battery 30, primary coil 21, and second main switch 25 is referred to as a first circuit.

When the first circuit forms a closed circuit, a current is supplied from the battery 30 to the primary coil 21 of the second ignition coil 20, and electrical energy is charged in the primary coil 21.

One end (e.g., a first end) of the secondary coil 22 is electrically connected to a center electrode 2 and the other end (e.g., a second end) thereof is electrically connected to the battery 30. A diode 23 is installed between the secondary coil 22 and the battery 30 to block a current from flowing from the secondary coil 22 to the battery 30. In addition, a diode 29 is installed between the secondary coil 22 and the center electrode 2, so that a current flows only from the secondary coil 22 to the center electrode 2.

The battery 30, the secondary coil 22, the center electrode 2, and the ground electrode 3 are connected in series, and a high voltage current (or induced electromotive force) is selectively generated in the secondary coil 22 according to the operation of the primary coil 21. In the specification of the present disclosure, an electric circuit formed by the series-connected battery 30, secondary coil 22, center electrode 2, and ground electrode 3 is referred to as a second circuit.

When the first circuit forms an open circuit by the second main switch 25, the primary coil 21 is discharged and a high voltage current is generated in the secondary coil 22 by electromagnetic induction. Accordingly, a current flows in the second circuit, and a high voltage current is supplied between the center electrode 2 and the ground electrode 3 to generate a spark discharge. In other words, a current selectively flows in the second circuit by the operation of the second main switch 25.

On the other hand, a second auxiliary switch 26 is connected in parallel to both ends of the primary coil 21. The primary coil 21 and the second auxiliary switch 26 selectively form a closed circuit. In the specification of the present disclosure, an electric circuit formed by the primary coil 21 and the second auxiliary switch 26 is referred to as a third circuit.

The second auxiliary switch 26 may be realized with a transistor switch (for example, an insulated gate bipolar transistor (IGBT)) including an emitter terminal 26-1, a collector terminal 26-3, and a base terminal 26-2. In this case, the emitter terminal 26-1 of the second auxiliary switch 26 is electrically connected between the primary coil 21 and the second main switch 25, the base terminal 26-2 thereof is electrically connected to the ignition controller, and the collector terminal 26-3 thereof is electrically connected to the battery.

When the ignition controller 40 applies a control signal to the base terminal 25-2 of the second main switch 25, the primary coil 21 of the first ignition coil 20 is electrically connected (the first circuit forms a closed circuit), and the primary coil 21 is charged with electrical energy.

When the ignition controller 40 does not apply a control signal to the base terminal 25-2 of the second main switch 25, a high voltage current (or discharge current) is generated in the secondary coil 22 due to electromagnetic induction of the primary coil 21 and the secondary coil 22. The discharge current generated in the secondary coil 22 flows to the center electrode 2. Also, while spark discharge is generated between the center electrode 2 and the ground electrode 3 by the discharge current generated in the secondary coil 22, an air-fuel mixture inside the combustion chamber 101 is ignited.

In other words, when a control signal is applied to the second main switch 25, the first circuit forms a closed circuit, and the primary coil 21 is charged by a current outputted from the battery 30. In addition, when no control signal is applied to the second main switch 25, the first circuit forms an open circuit. Also, while a high voltage current induced in the secondary coil 22 is applied to the center electrode 2 along the second circuit, a spark discharge is generated between the center electrode 2 and the ground electrode 3.

While the first circuit forms the closed circuit, when the control signal is applied to the base terminal 26-2 of the second auxiliary switch 26, the third circuit forms a closed circuit. In this case, when the third circuit forms the closed circuit, the primary coil 21 electrically connected to the battery 30 is no longer charged, and the electrical energy already charged in the primary coil 21 while flowing along the third circuit remains stored.

While the first circuit forms the open circuit (in other words, while the secondary coil is discharged), when the control signal is applied to the base terminal 26-2 of the second auxiliary switch 26, the third circuit forms a closed circuit. In this case, when the third circuit forms the closed circuit, the electrical energy charged in the primary coil 21 flows along the third circuit, and the voltage applied to the secondary coil 22 is considerably reduced. Accordingly, the discharge in the secondary coil 22 is temporarily stopped.

The ignition coil control system according to the embodiment of the present disclosure may be operated in four modes including a first mode to a fourth mode.

In other words, the ignition controller 40 controls the on/off of the main switches 15 and 25 and the auxiliary switches 16 and 26, so that the first to fourth modes may be selectively performed. To this end, the ignition controller 40 may be provided as at least one processor executed by a predetermined program. The predetermined program is configured to perform respective steps of a control method of the ignition coil control system according to the embodiment of the present disclosure.

The first mode is a mode in which the first circuit forms a closed circuit to charge the primary coils 11 and 21. The second mode is also a mode for charging the primary coils 11 and 21. The third mode is a mode in which the third circuit forms an open circuit to discharge the secondary coils 12 and 22. The fourth mode is a mode for temporarily stopping the discharge of the secondary coils 12 and 22 while discharging the secondary coils 12 and 22 (or while the third mode is being performed).

In other words, the first mode and the second mode may be charge modes of the ignition coils 10 and 20, the third mode may be a discharge mode of the ignition coils 10 and 20, and the fourth mode may be a neutral mode for temporarily stopping the discharge of the ignition coils 10 and 20.

Figure 3:
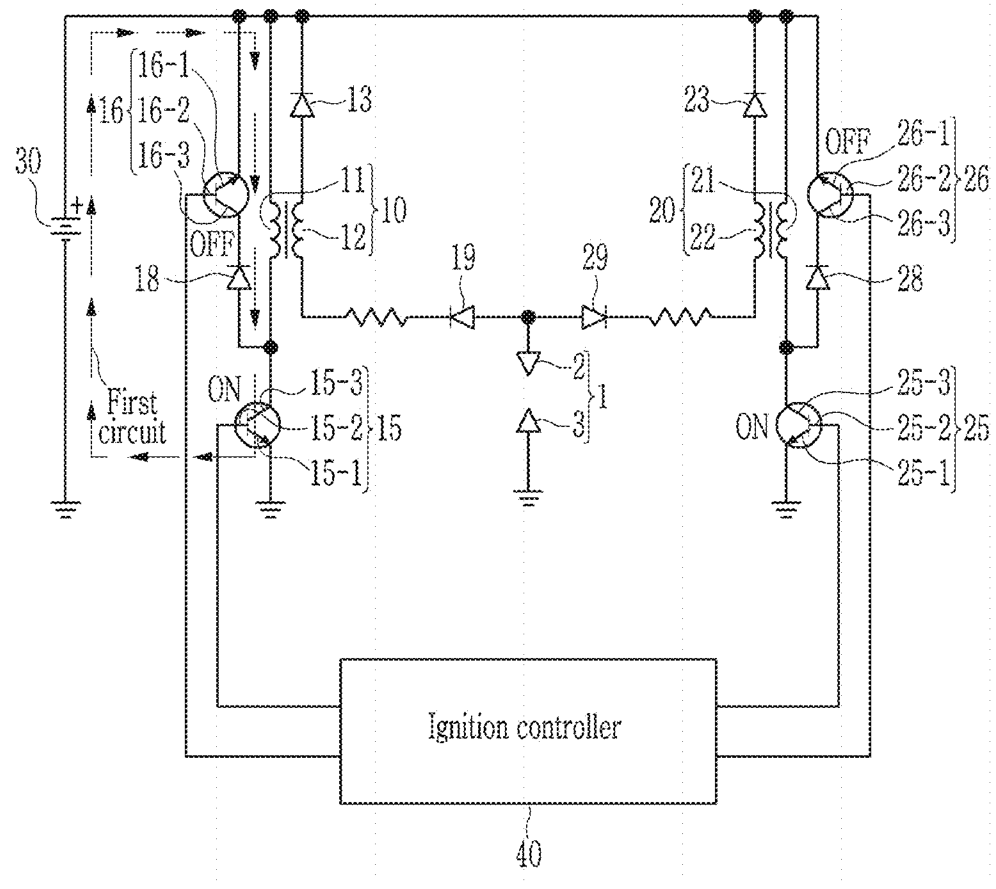
FIGS. 3-6 are drawings for explaining an operation mode of an ignition coil control system according to an embodiment of the present disclosure.

Referring to FIG. 3, in the first mode, the main switches 15 and 25 are turned on, while the auxiliary switches 16 and 26 are turned off by the control signal of the ignition controller 40. Accordingly, the first circuit forms a closed circuit, and electrical energy is charged to the primary coils 11 and 12 electrically connected to the battery 30.

In other words, when a control signal is applied to the main switches 15 and 25 and the auxiliary switches 16 and 26 are turned off, the first circuit forms a closed circuit, and the primary coils 11 and 21 are charged by the current outputted from the battery 30.

Figure 4:
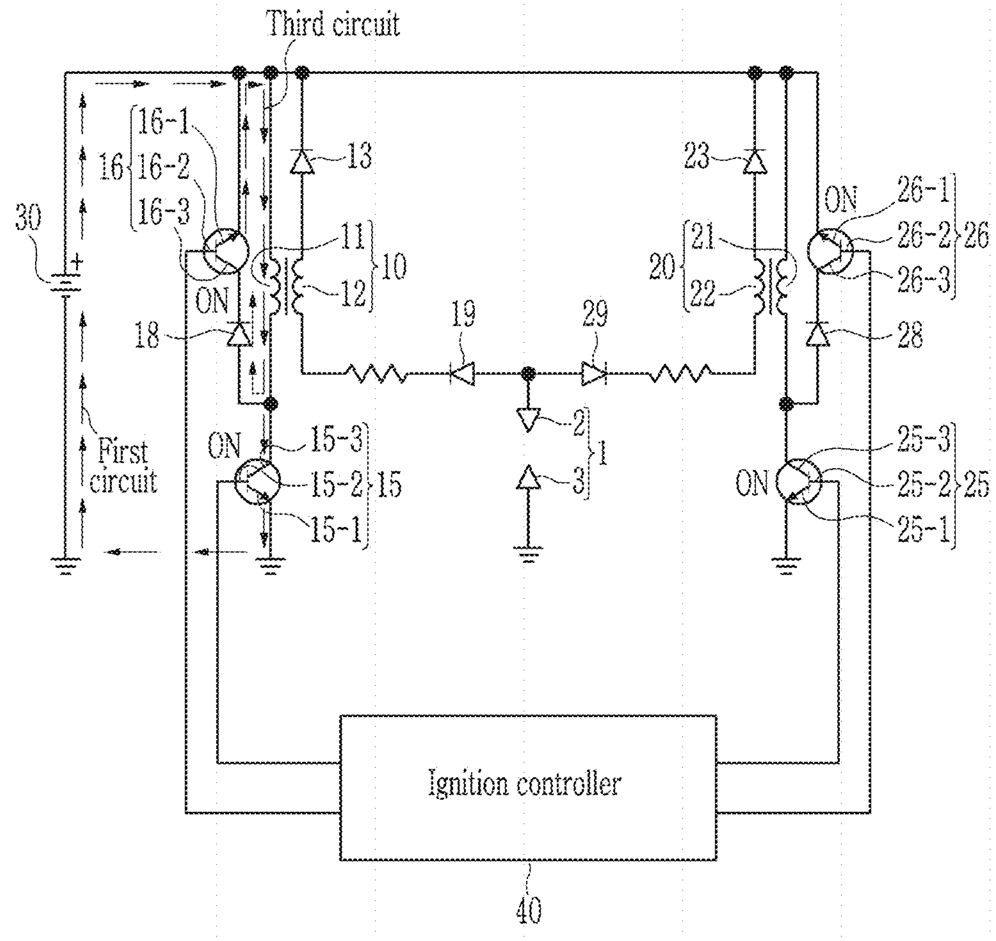

Referring to FIG. 4, in the second mode, the main switches 15 and 25 are turned on and the auxiliary switches 16 and 26 are also turned on, by the control signal of the ignition controller 40. Accordingly, the first circuit forms a closed circuit and the third circuit also forms a closed circuit. Although the first circuit and the third circuit form the closed circuit, since a potential difference is generated in the primary coils 11 and 21 as the first circuit forms the closed circuit, electrical energy is charged in the primary coils 11 and 21.

In other words, while the main switches 15 and 25 are turned on by the ignition controller 40 so that the first circuit forms the closed circuit, even if the second circuit forms the closed circuit, the primary coils 11 and 21 are charged by the current outputted from the battery 30.

Figure 5:
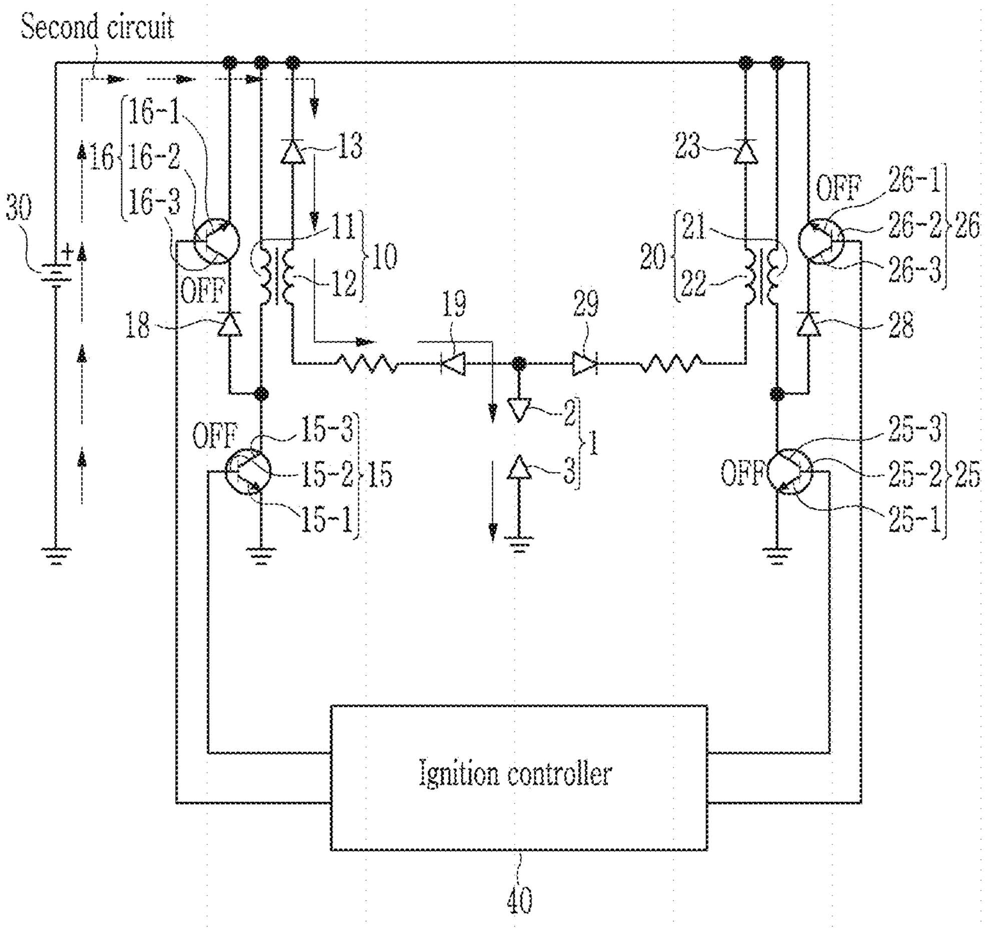

Referring to FIG. 5, in the third mode, the main switches 15 and 25 are turned off, while the auxiliary switches 16 and 26 are turned off by the control signal of the ignition controller 40. Accordingly, a high-voltage discharge current is induced in the secondary coils 12 and 22 by the electromagnetic induction of the primary coils 11 and 21 and the secondary coils 12 and 22. The high-voltage discharge current induced in the secondary coils 12 and 22 is supplied to the center electrode 2 and the ground electrode 3, so that spark discharge occurs between the center electrode 2 and the ground electrode 3. The third mode may be a discharge mode of the ignition coil.

In other words, when no control signal is applied to the main switches 15 and 25 and the auxiliary switches 16 and 26, the first circuit forms an open circuit. Also, while the high-voltage current induced in the secondary coils 12 and 22 is applied to the center electrode 2 along the second circuit, a spark discharge is generated between the center electrode 2 and the ground electrode 3.

Figure 6:
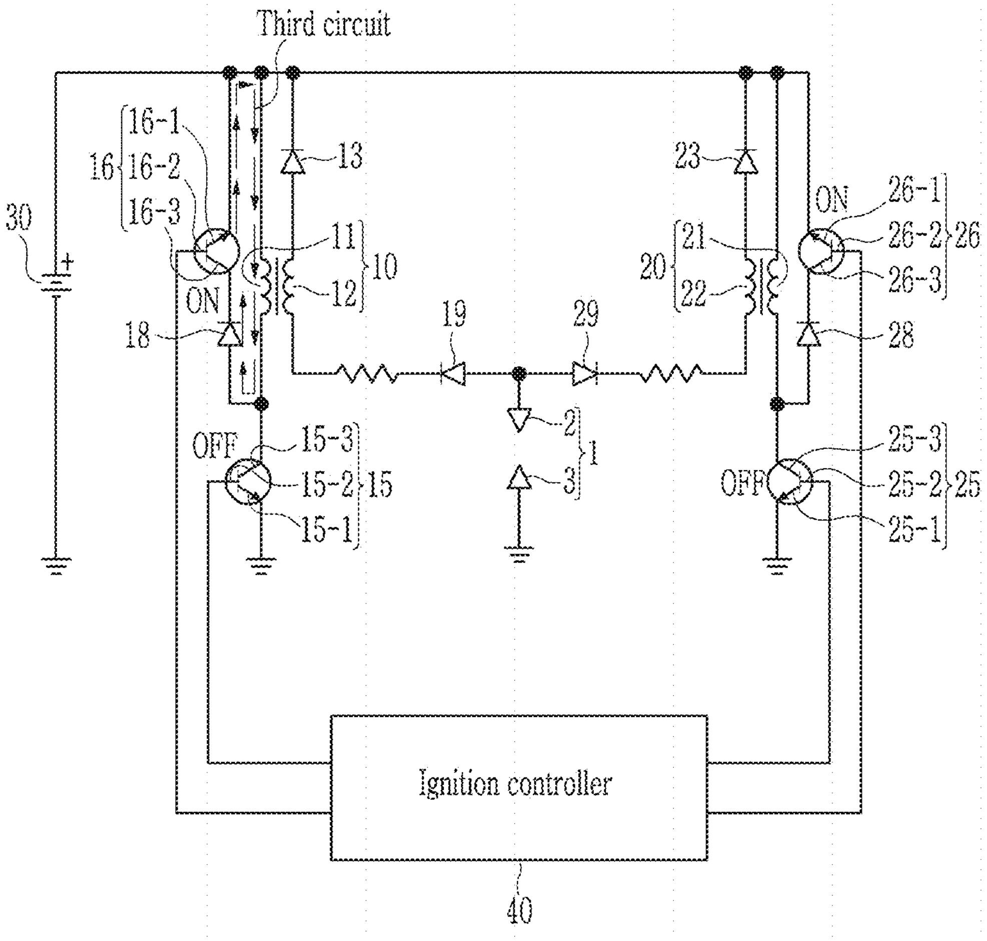

Referring to FIG. 6, in the fourth mode, the main switches 15 and 25 are turned off, while the auxiliary switches 16 and 26 are turned on, by the control signal of the ignition controller 40. Accordingly, the induced current is no longer discharged in the secondary coils 12 and 22. The fourth mode may be a neutral mode that temporarily stops the discharge of the ignition coils 10 and 20.

In other words, while the first circuit forms an open circuit (in other words, while the secondary coils 12 and 22 are discharged), when a control signal is applied to the base terminals 16-2 and 26-2 of the auxiliary switches 16 and 26 by the ignition controller 40, the third circuit forms a closed circuit. In this case, when the third circuit forms the closed circuit, the electrical energy charged in the primary coils 11 and 21 flows along the third circuit, and the voltage applied to the secondary coils 12 and 22 is considerably reduced. Accordingly, the discharge in the secondary coils 12 and 22 is temporarily stopped.

Hereinafter, the operation of the ignition coil control system according to the embodiment of the present disclosure as described above is described in detail with reference to the accompanying drawings.

Figure 7:
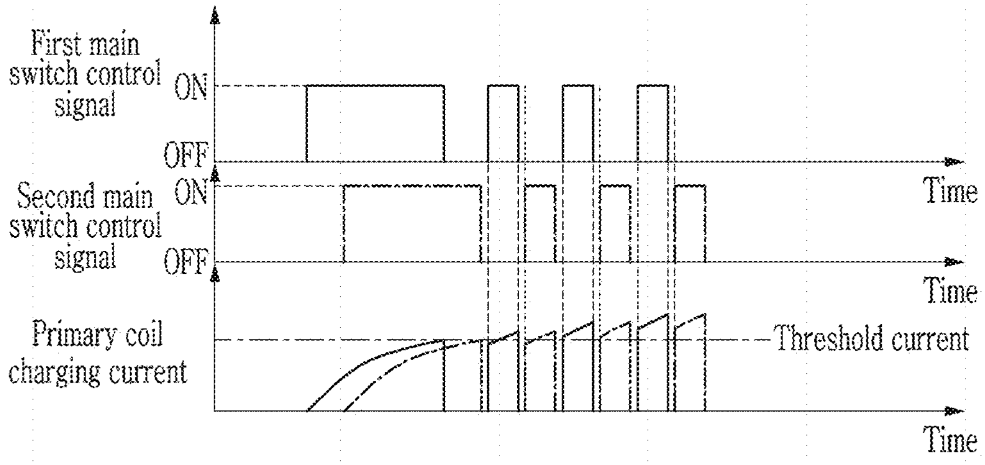
FIGS. 7 and 8 are drawings for explaining an operation of an ignition coil control system according to an embodiment of the present disclosure.
Figure 8:
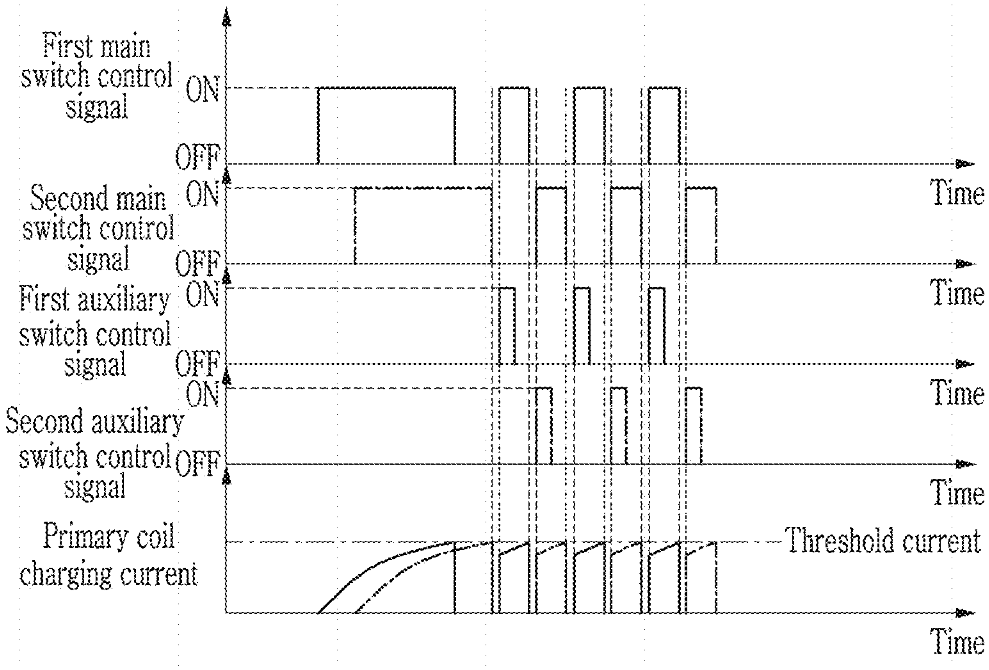

FIGS. 7 and 8 are drawings for explaining an operation of an ignition coil control system according to an embodiment of the present disclosure. FIG. 7 illustrates an operation of the ignition coil control system when the third circuit is not used and FIG. 8 illustrates an operation of the ignition coil control system when the third circuit is used.

First, referring to FIG. 7, when a control signal is respectively applied to the primary coil 11 of the first ignition coil 10 and the primary coil 21 of the second ignition coil 20 (or when the first ignition coil 10 and the second ignition coil 10 operate in the first mode), electrical energy (or a current) is respectively charged to the primary coils 11 and 21. While the control signal is applied to the primary coils 11 and 21 of the ignition coils 10 and 20 by the ignition controller 40, the electrical energy charged in the primary coils 11 and 21 gradually increases. In other words, the ignition controller 40 turns on (or controls) the main switches 15 and 25 to charge the primary coils 11 and 21.

In this case, the control signal respectively applied to the primary coil 11 of the first ignition coil 10 and the primary coil 21 of the second ignition coil 20 may be configured of a plurality of pulses. Also, the control signal applied to the primary coil 21 of the second ignition coil 20 is delayed by a set time (for example, a delay time) from the control signal applied to the primary coil 11 of the first ignition coil 10. Accordingly, it is possible to implement multi-stage ignition in which spark discharge is repeatedly performed in the first ignition coil 10 and the second ignition coil 20.

In addition, when the control signal is not respectively applied to the primary coil 11 of the first ignition coil 10 and the primary coil 21 of the second ignition coil 20 (or when the first ignition coil 10 and the second ignition coil operate in the third mode), a discharge current is respectively induced in the secondary coils 12 and 22 of respective ignition coils 10 and 20, and spark discharge is generated between the center electrode 2 and the ground electrode 3. In other words, the ignition controller 40 controls the main switches 15 and and the auxiliary switches 16 and 26 (for example, turns off the main switches and 25 and the auxiliary switches 16 and 26) to discharge the secondary coils 12 and 22.

However, the case may occur in which the output voltage varies according to the charge state of the battery 30 and the electrical energy is excessively discharged from the secondary coils 12 and 22 depending on the flow state inside the combustion chamber according to the operating point of the engine (the case in which the current discharged from the secondary coil exceeds the threshold current). To solve this, when the duty (e.g., ratio of pulse duration to pulse period) of the control signal is adjusted (for example, reduced), the efficiency of the system may be reduced (e.g., reducing the current discharged by the second coil).

Referring to FIG. 8, while the secondary coils 12 and 22 are discharged by the main switches 15 and 25 that are turned off (or while the ignition coil control system is operated in the third mode), it is possible to allow the third circuit to form a closed circuit by turning on the auxiliary switches 16 and 26. Accordingly, as the current charged in the primary coils 11 and 21 flows along the third circuit, the discharge in the secondary coils 12 and 22 is temporarily stopped. In other words, the ignition controller 40 turns off the main switches 15 and 25 and turns on the auxiliary switches 16 and 26 to temporarily stop the discharge of the secondary coils 12 and 22.

According to the ignition coil control system according to the embodiment of the present disclosure as described above, the ignition coil control system may selectively operate in one of the first to fourth modes by controlling the turning on/off of the main switches 15 and 25 and the auxiliary switches 16 and 26.

By selectively operating the ignition coil control system in one of the first to fourth modes, it is possible to temporarily stop the discharging of the ignition coil to prevent the ignition coil from being overly discharged.

While this disclosure has been described in connection with what is presently considered to be practical embodiments, it is to be understood that the disclosure is not limited to the disclosed embodiments. On the contrary, disclosure is intended to cover various modifications and equivalent arrangements included within the spirit and scope of the appended claims.

DESCRIPTION OF SYMBOLS

1: spark plug
2: center electrode
3: ground electrode
10: first ignition coil
11: primary coil
12: secondary coil
13: diode
15: first main switch
15-1: emitter terminal
15-2: base terminal
15-3: collector terminal
16: first auxiliary switch
16-1: emitter terminal
16-2: base terminal
16-3: collector terminal
19: diode
20: second ignition coil
21: primary coil
22: secondary coil
23: diode
25: second main switch
25-1: emitter terminal
25-2: base terminal
25-3: collector terminal
26: second auxiliary switch
26-1: emitter terminal
26-2: base terminal
26-3: collector terminal
29: diode
30: battery
40: ignition controller
100: cylinder head
101: combustion chamber
110: mount hole

What is claimed is:

1. An ignition coil control system, comprising:
a spark plug that generates a spark discharge between a center electrode and a ground electrode; and
two ignition coils that respectively apply a current to the spark plug and respectively include a primary coil, a secondary coil, and a main switch that selectively connects the primary coil,
wherein an auxiliary switch is connected in parallel to each of the primary coils.

2. The ignition coil control system of claim 1, wherein:
the ignition coil control system forms a first circuit in which a battery, the primary coil, and the main switch selectively form a closed circuit;
a second circuit in which the secondary coil, the center electrode, and the ground electrode selectively form a closed circuit; and
a third circuit in which the primary coil and the auxiliary switch selectively form a closed circuit.

3. The ignition coil control system of claim 2, wherein:
a first mode in which the first circuit forms a closed circuit to charge the primary coil;
a second mode in which the first circuit and the second circuit form a closed circuit to charge the primary coil;
a third mode in which the third circuit forms an open circuit to discharge the secondary coil; and
a fourth mode that temporarily stops discharge of the secondary coil while discharging the secondary coil are selectively performed.

4. The ignition coil control system of claim 3, wherein, in the first mode, the main switch is turned on while the auxiliary switch is turned off.

5. The ignition coil control system of claim 3, wherein, in the second mode, the main switch is turned on and the auxiliary switch is turned on.

6. The ignition coil control system of claim 3, wherein, in the third mode, the main switch is turned off and the auxiliary switch is turned off.

7. The ignition coil control system of claim 3, wherein, in the fourth mode, the main switch is turned off while the auxiliary switch is turned on.

8. A control method of an ignition coil control system that includes a spark plug that generates a spark discharge between a center electrode and a ground electrode and includes two ignition coils that respectively apply a current to the spark plug and respectively include a primary coil, a secondary coil, a main switch that selectively connects the primary coil, and an auxiliary switch that is connected in parallel to the primary coils, the method comprising:

charging the primary coil by controlling the main switch; and controlling the auxiliary switch to temporarily stop discharge of the primary coil while the primary coil is being discharged.

* * * * *